(12) United States Patent
Tracht et al.

(10) Patent No.: US 7,377,542 B2
(45) Date of Patent: May 27, 2008

(54) VEHICLE SEAT SIDE AIR BAG SYSTEM

(75) Inventors: Michael L. Tracht, Ingolstadt (DE);
Richard G. Dierl, Sandersdoft (DE);
Sebastian Uschold, Munich (DE)

(73) Assignee: Lear Corporation, Southfield, MI (US)

( * ) Notice: Subject to any disclaimer, the term of this patent is extended or adjusted under 35 U.S.C. 154(b) by 404 days.

(21) Appl. No.: 10/904,846

(22) Filed: Dec. 1, 2004

(65) Prior Publication Data

US 2006/0113766 A1 Jun. 1, 2006

(51) Int. Cl.
*B60R 21/16* (2006.01)
*B60R 21/20* (2006.01)

(52) U.S. Cl. ................... 280/730.2; 280/728.2

(58) Field of Classification Search ............. 280/730.2, 280/728.2, 743.1; 297/218.2
See application file for complete search history.

(56) References Cited

U.S. PATENT DOCUMENTS

| | | | |
|---|---|---|---|
| 3,928,898 A * | 12/1975 | Smoot ...................... 297/218.1 |
| 5,498,030 A | 3/1996 | Hill et al. |
| 5,678,853 A | 10/1997 | Maly |
| 5,749,597 A | 5/1998 | Saderholm |
| 5,762,363 A | 6/1998 | Brown et al. |
| 5,799,970 A * | 9/1998 | Enders .................... 280/730.2 |
| 5,816,610 A | 10/1998 | Higashiura et al. |
| 5,860,673 A | 1/1999 | Hasegawa et al. |
| 5,863,063 A | 1/1999 | Harrell |
| 5,927,749 A | 7/1999 | Homier et al. |
| 5,938,232 A | 8/1999 | Kalandek et al. |
| 5,967,603 A | 10/1999 | Genders et al. |
| 6,045,151 A | 4/2000 | Wu |
| 6,095,602 A | 8/2000 | Umezawa et al. |
| 6,155,593 A | 12/2000 | Kimura et al. |
| 6,237,934 B1 | 5/2001 | Harrell et al. |
| 6,386,577 B1 * | 5/2002 | Kan et al. ................. 280/730.2 |
| 6,422,590 B1 | 7/2002 | Umezawa et al. |
| 6,578,911 B2 * | 6/2003 | Harada et al. ......... 297/216.13 |
| 6,588,838 B1 | 7/2003 | Dick, Jr. et al. |
| 2005/0156412 A1 * | 7/2005 | Panagos et al. .......... 280/730.2 |
| 2006/0131848 A1 | 6/2006 | Miyake et al. |

FOREIGN PATENT DOCUMENTS

| | | |
|---|---|---|
| DE | 20318978 U U1 | 2/2004 |
| EP | 0 788 940 A3 | 8/1997 |
| EP | 1 034 989 A3 | 9/2000 |
| JP | 11078758 A | 9/1997 |

* cited by examiner

*Primary Examiner*—Ruth Ilan
*Assistant Examiner*—Tiffany L. Webb
(74) *Attorney, Agent, or Firm*—Brooks Kushman P.C.

(57) ABSTRACT

A side air bag module is disposed in a cavity in a vehicle seat. At least one reinforcement panel is secured to either the air bag module or the seat frame on an anchoring edge. The opposite edge of the reinforcement panel is sewn to a hem on one side of a tear seam. A barbed retainer may be inserted in a slot to bear upon a peripheral flange portion of the air bag module.

5 Claims, 3 Drawing Sheets

VEHICLE SEAT SIDE AIR BAG SYSTEM

BACKGROUND OF THE INVENTION

1. Field of the Invention

The present invention relates to a vehicle seat mounted side air bag restraint system.

2. Background Art

Vehicle seat air bag restraint systems are used to protect vehicle occupants in the event of a side impact. To be effective, air bag restraint systems must deploy rapidly. Vehicle seats generally include a rigid frame to which foam pads are secured. The seat is enclosed within a cover made of vinyl, cloth or leather. Air bag modules are secured to the seat frame and generally include a housing, an air bag and an inflator system.

The elasticity of covering materials and urethane foam padding present a problem for air bag deployment. As the air bag deploys, it must be channeled so that the air bag deploys through an air bag tear seam in the seat cover material. The elasticity of the seat cover material allows the air bag to expand and cause the seat cover material to bulge. This may increase air bag deployment time and result in variation in air bag deployment location. The resiliency and tendency of the foam material to deform or fragment is another problem that must be solved.

One attempt to solve the above problems is disclosed in U.S. Pat. No. 6,045,151 to Wu that employs a force concentrator that at least partially surrounds the folded air bag and concentrates or directs the force of the inflating air bag to the designed deployment seam. The force concentrator avoids application of air bag deployment load on the trim cover material to reduce the influence of the trim cover as a design factor for air bag deployment. The force concentrator is an inelastic structure that surrounds or at least partially surrounds the air bag of an air bag module. This patent requires two panels to form the force concentrator. The use of two panels complicates and assembly and may require that multiple pieces be joined together by seams. The Wu patent also discloses that a single panel may work on only one side of the deployment seam, but states that it must be verified that the addition of the concentrator does not induce trim cover failure elsewhere.

In developing alternative designs to solve the problems associated with the Wu patent, other problems are presented that relate to assembling the air bag module to the seat with the force concentrator. It is difficult to assemble the module to the seat frame, the concentrator and the seat cover. The cost of the component parts including the cost of the concentrator fabric should be minimized and the labor required to perform the assembly operation must also be minimized. In addition, the speed of deployment and deployment location must be controlled and predictable for product specification and quality standards certification.

Applicant's invention is directed to solving the above problem as summarized below.

SUMMARY OF THE INVENTION

According to one aspect of the present invention, a vehicle seat assembly is provided that comprises a frame and a pad formed of a shaped foam polymer material. The pad defines a pocket for receiving an air bag restraint sub-assembly and that is assembled to the frame. A restraint sub-assembly has a housing in which an air bag and an inflator are received. The housing has a split line that splits a wall of the housing. Upon inflation of the air bag by the inflator, the air bag is deployed through the split line. A trim cover is assembled to the pad and substantially encloses the frame, the pad and the restraint sub-assembly. The trim cover has a tear seam that opens when the air bag is deployed. At least one reinforcement panel extends partially around at least one side of the housing and between the housing and the trim cover. The reinforcement panel is held in engagement with the frame by a clip on a first edge of the reinforcement panel. The reinforcement panel is secured to the trim cover on a second edge at the tear seam. The reinforcement panel resists elastic deformation of the trim cover when the air bag is deployed and channels the air bag during deployment toward the tear seam.

According to another aspect of the invention, a cushion assembly is provided for a vehicle seat. The cushion assembly comprises a rigid support structure and an air bag system including an inflatable air bag and an inflator contained within a housing. The air bag system is secured to the support structure. A pair of flexible reinforcement sheets are disposed proximate the air bag system for guiding deployment of the air bag. A pad is secured to the support structure adjacent to the air bag system. A cover material overlays the pad, the reinforcement sheets and the air bag system. The cover material has first and second hems that are disposed in an abutting relationship and are secured together by a tear seam. A first edge of each of the reinforcement sheets is sewn into one of the hems. The stitching for the tear seam is sewn through the reinforcement panels. At least two retainers connect a second edge of each of the reinforcement sheets in a fixed relationship relative to the air bag system. Upon inflation of the air bag, each of the reinforcement sheets move away from each other to allow the air bag to deploy between the first and second hems of the cover material.

According to other aspects of the invention, the clip may be attached directly to a portion of the frame at a location spaced from the air bag restraint sub-assembly. Alternatively, the clip may be attached to a clip receiving flange formed on the air bag restraint sub-assembly. The clip receiving flange may be a flange extending about a portion of the outer edge of the air bag restraint sub-assembly. The clip may have a hook shaped end that has a barb that is received between a wall of the air bag restraint sub-assembly and the clip receiving flange. The air bag restraint subassembly may be a side air bag module wherein the pocket may be located in an outboard wall of a seat back portion of the vehicle seat. The reinforcement panel may be a flexible sheet of material that is less elastic than the trim cover. The reinforcement panel, or panels, may be sewn to the trim cover.

Other aspects of the present invention will be better understood in view of the attached drawings and following detailed description of several embodiments of the invention.

DETAILED DESCRIPTION OF THE PREFERRED EMBODIMENT(S)

Figure 1:
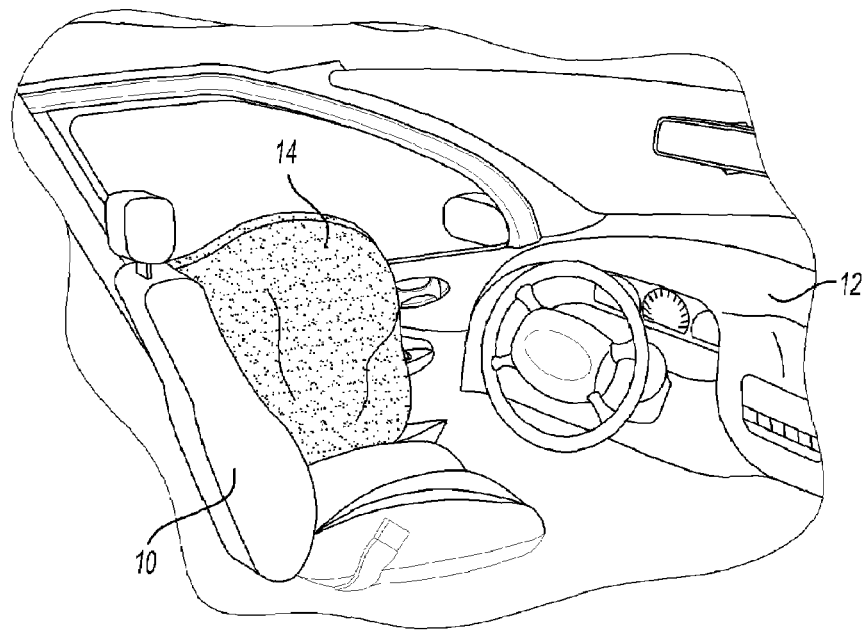
FIG. 1 is a fragmentary perspective view of the interior of a vehicle having a seat that is provided with a side air bag that is shown during deployment.

Referring now to FIG. 1, a seat 10 for vehicle 12 is shown with a side air bag 14 during deployment. The side air bag 14 is deployed in the event of a side impact to the vehicle 12. The side air bag 14 is deployed between the seat 10 and adjacent side of the vehicle 12 which is in most instances a vehicle door.

Figure 2:
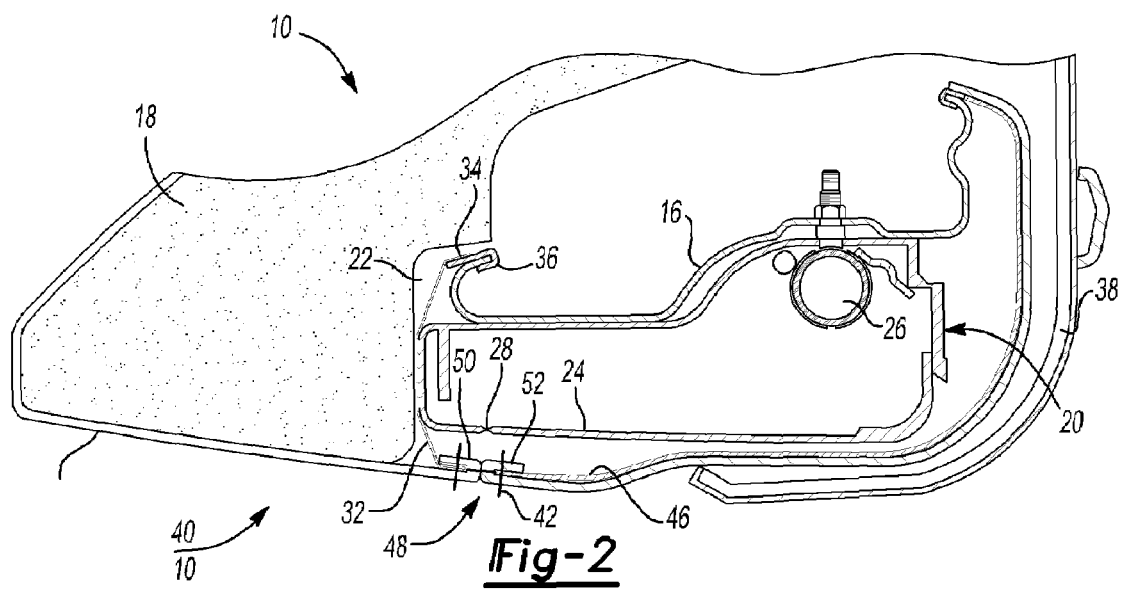
FIG. 2 is a fragmentary cross-sectional view of a vehicle seat having a side air bag module and one embodiment of a reinforcement panel and retention clip.
Figure 3:
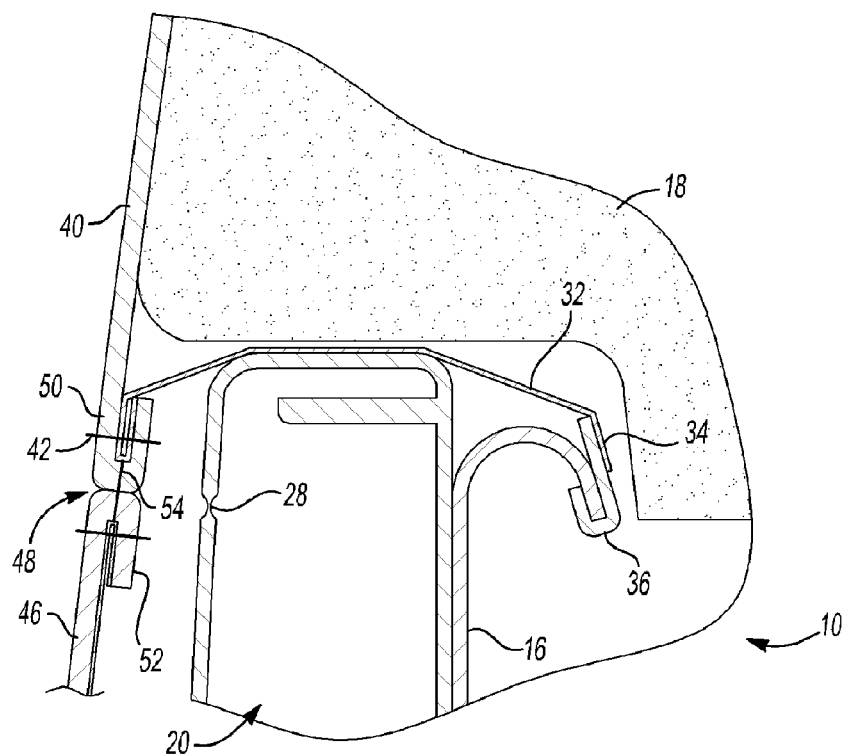
FIG. 3 is a fragmentary cross-sectional view of a vehicle seat having a side air bag module and another embodiment of a reinforcement panel and retention clip.

Referring to FIGS. 2 and 3, a portion of seat 10 is shown to include a frame 16 to which foam padding material comprising a foam pad 18 is secured. An air bag module 20 is received in a pocket 22 formed by the frame 16 and pad 18. The air bag module 20 has a housing 24 in which an inflator 26 is disposed. A folded air bag 14 is normally retained within the housing 24 that is inflated by the inflator 26. The housing 24 has a split line 28 and may be formed as a groove or perforation in the housing 24 that creates a stress riser in the housing so that the housing splits predictably at the split line 28.

A reinforcement panel 32 is secured at an anchoring edge 34 by retainer clips 36 that hold the panel 32 on the frame 16. The seat 10 includes a seat back shell 38 that covers and protects the back of the seat 10.

The seat 10 has a cover 40 that covers the foam pad 18 and air bag module 20. The panel 32 has a cover affixed edge 42 and also has a cover flap 46 that extends across the outboard side of the air bag 14 to the tear seam 48. Tear seam 48 includes a panel hem 50 and a flap hem 52. The panel hem 50 and flap hem 52 are doubled back hems formed of the cover material. The panel hem 50 is sewn to the cover affixed reversely turned edge 42 of the panel 32. The flap hem 52 may also include a reinforcement textile 68 as will be more fully described below. The panel hem 50 and flap hem 52 are sewn together by means of tear stitches as shown in FIG. 3.

Figure 4:
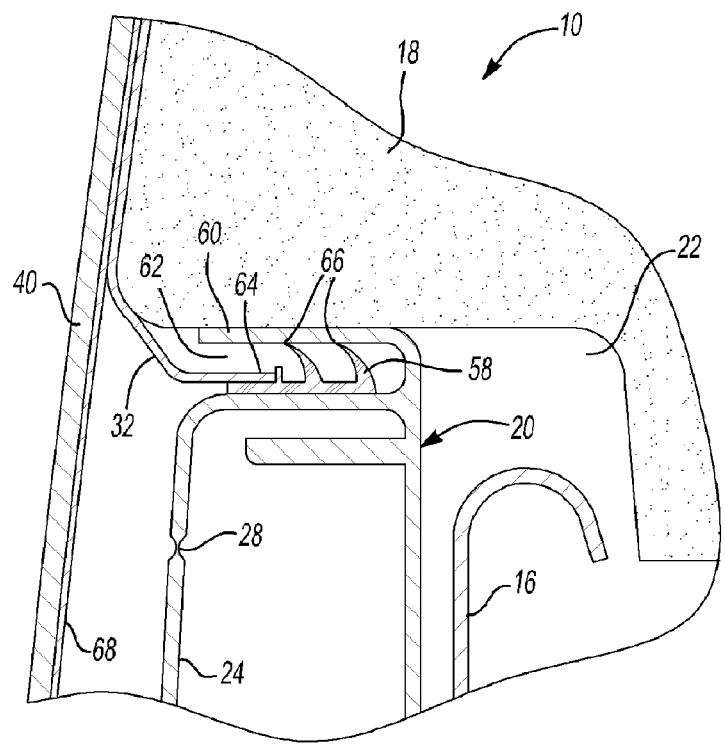
FIG. 4 is a fragmentary cross-sectional view of a vehicle seat having a side air bag module and another embodiment of a reinforcement panel and retention clip.

Referring to FIG. 4, an alternative embodiment is illustrated in which a barbed retainer 58 is inserted in and retained by a flange 60 that may be molded into the air bag module 20. The flange 60 defines a slot 62 in which anchoring edge 64 of the panel 32 is secured by the barbed retainer 58. The barbed retainer 58 may easily be inserted into the slot 62 but the barbs 66 resist removal by digging into the flange 60 when an extracting force is applied to panel 32. A laminated, or sewn, reinforcement textile 68 may be provided on the inner side of the cover flap 46 or in other areas of the cover, as required.

Figure 5:
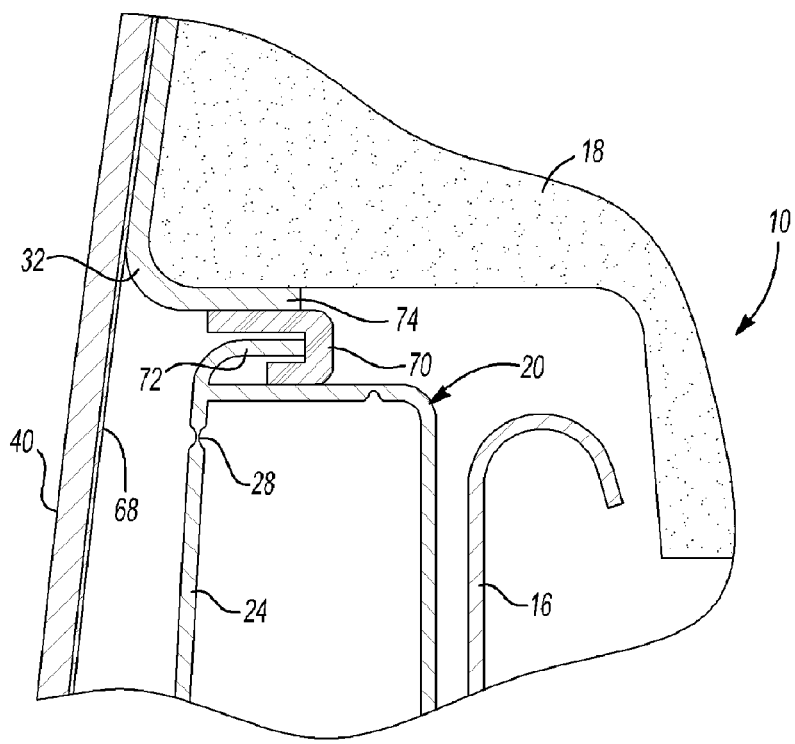
FIG. 5 is a fragmentary cross-sectional view of a vehicle seat having a side air bag module and another alternative embodiment of a reinforcement panel and retention clip.

Referring to FIG. 5, an alternative embodiment is shown in which a retainer clip 70 is secured to an inwardly opening flange 72. An anchoring edge 74 of the panel 32 is secured to the retainer clip 70 and a laminated reinforcement textile 68 is laminated to the inside of the cover 40.

Figure 6:
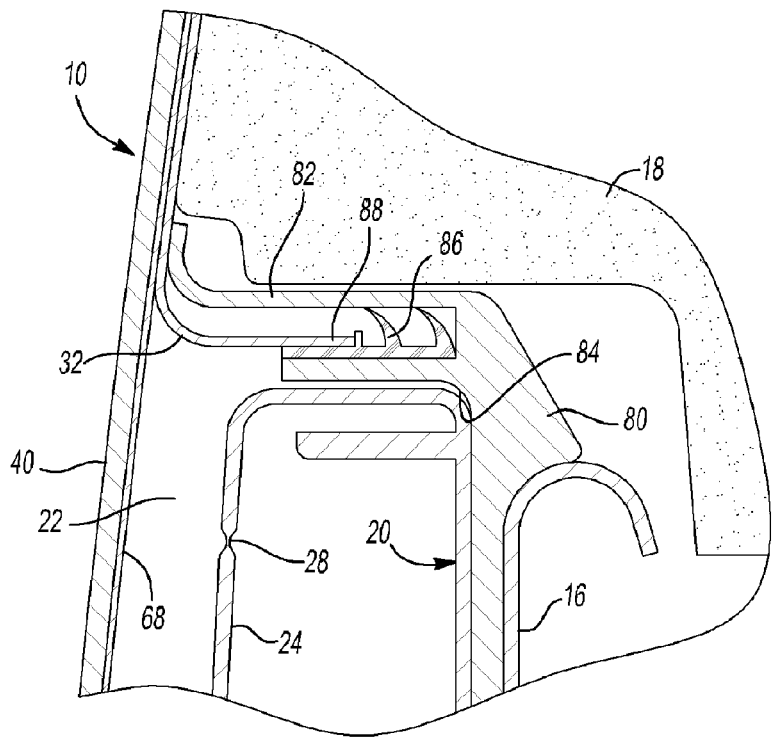
FIG. 6 is a fragmentary cross-sectional view of a vehicle seat having a side air bag module and another alternative embodiment of a reinforcement panel and retention clip.

Referring to FIG. 6, vehicle seat 10 is shown to include the foam pad 18 and the frame 16. The air bag module 20 is retained within the pocket 22 on a molded mounting bracket 80. The molded mounting bracket 80 has a peripheral flange 82 and also defines a seat 84 for the air bag module 20. A barbed retainer 86 similar to that shown in FIG. 4 is inserted behind the peripheral flange 82 so that it may be easily assembled but difficult to remove from the flange 82. The reinforcement panel 32 is secured at an anchoring edge 88 to the barbed retainer 86.

The peripheral flange 82 may include a radiused or beveled surface that forms a weft ramp 90 providing a transition surface over which the air bag 14 may deploy. The air bag is intended to be deployed generally along a line extending from the split line 28 on the air bag module 14 and the area at which the panel 32 and weft ramp 90 are near to each other. The cover 40 may have a laminated reinforcement textile 68 on its inner surface that resists deformation of the cover in the event of an air bag deployment. The air bag deploys from an air bag module 20 and between the laminated reinforcement textile 68 and weft ramp 90 in what may be referred to as the weft direction, or deployment direction.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
a frame;
a pad formed of a shaped foam polymer material, the pad defining a pocket;
a restraint sub-assembly being placed in the pocket and assembled to the frame, the restraint sub-assembly having a housing in which an air bag and an inflator are received, the housing having a split line, wherein upon inflation of the air bag by the inflator, the air bag is deployed through the split line;
a trim cover assembled to the pad that substantially encloses the frame, the pad and the restraint sub-assembly, the trim cover opens when the air bag is deployed;
at least one reinforcement panel extending partially around at least one side of the housing and between the housing and the trim cover, the reinforcement panel having an anchoring edge, wherein the reinforcement panel is held in engagement with the frame by a retainer on the anchoring edge, wherein the retainer is disposed between a flange and the restraint sub-assembly, wherein the retainer has a barb that is lodged between the flange and the restraint sub-assembly, and wherein the reinforcement panel resists elastic deformation when the air bag is deployed.

2. The vehicle seat assembly of claim 1 wherein the restraint sub-assembly is a side air bag module and the pocket is located in an outboard wall of a seat back portion of the vehicle seat.

3. The vehicle seat assembly of claim 1 wherein the reinforcement panel is a flexible sheet of material that is less elastic than the trim cover.

4. The vehicle seat assembly of claim 1 wherein the reinforcement panel is sewn to the trim cover.

5. The vehicle seat assembly of claim 1 wherein a laminated reinforcement textile is provided on an inner side of a cover flap.

* * * * *